(12) United States Patent
Callway et al.

(10) Patent No.: US 6,680,752 B1
(45) Date of Patent: Jan. 20, 2004

(54) METHOD AND APPARATUS FOR DEINTERLACING VIDEO

(75) Inventors: Edward G. Callway, Toronto (CA); Philip L. Swan, Richmond Hill (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/539,572

(22) Filed: Mar. 31, 2000

(51) Int. Cl.$^7$ .......................... H04N 7/01; H04N 11/20
(52) U.S. Cl. .................................. 348/448; 348/441
(58) Field of Search ................................. 348/448, 441, 348/449, 450, 451, 452, 458; H04N 7/01, 11/20, 11/22

(56) References Cited

U.S. PATENT DOCUMENTS

| | | | |
|---|---|---|---|
| 4,472,732 A | 9/1984 | Bennett et al. | |
| 4,631,750 A | 12/1986 | Gabriel et al. | |
| 4,680,628 A | 7/1987 | Wojcik et al. | |
| 4,740,842 A | 4/1988 | Annegarn et al. | |
| 4,868,655 A | * 9/1989 | Choquet et al. | 348/448 |
| 4,908,874 A | 3/1990 | Gabriel | |
| 4,941,045 A | 7/1990 | Birch | |
| 4,947,251 A | 8/1990 | Hentschel | |
| 4,982,280 A | 1/1991 | Lyon et al. | |
| 4,989,090 A | 1/1991 | Campbell et al. | |
| 5,014,119 A | 5/1991 | Faroudja | |
| 5,046,164 A | 9/1991 | Hurst, Jr. | |
| 5,055,927 A | * 10/1991 | Keesen et al. | 348/389.1 |
| 5,128,791 A | 7/1992 | LeGall et al. | |
| 5,134,480 A | 7/1992 | Wang et al. | |
| 5,151,783 A | 9/1992 | Faroudja | |
| 5,159,451 A | 10/1992 | Faroudja et al. | |
| 5,237,414 A | 8/1993 | Faroudja | |
| 5,289,305 A | 2/1994 | Lake, Jr. | |
| 5,327,240 A | 7/1994 | Golston et al. | |
| 5,408,270 A | 4/1995 | Lim | |
| 5,428,398 A | 6/1995 | Faroudja | |
| 5,467,138 A | 11/1995 | Gove | |
| 5,508,746 A | 4/1996 | Lim | |
| 5,596,371 A | 1/1997 | Pakhchyan et al. | |
| 5,602,654 A | 2/1997 | Patti et al. | |
| 5,619,272 A | * 4/1997 | Salmon et al. | 348/452 |
| 5,661,525 A | 8/1997 | Kovacevic et al. | |
| 5,864,369 A | * 1/1999 | Swan | 348/448 |
| 5,943,099 A | 8/1999 | Kim | |
| 6,118,486 A | * 9/2000 | Reitmeier | 348/441 |
| 6,121,978 A | 9/2000 | Miler | |
| 6,141,056 A | * 10/2000 | Westerman | 348/448 |
| 6,188,437 B1 | * 2/2001 | Webb et al. | 438/448 |
| 6,266,092 B1 | * 7/2001 | Wang et al. | 348/448 |
| 6,330,032 B1 | * 12/2001 | Boehlke | 348/452 |
| 6,340,990 B1 | * 1/2002 | Wilson | 348/448 |
| 6,414,719 B1 | * 7/2002 | Parikh | 348/448 |
| 6,456,329 B1 | * 9/2002 | Tinker et al. | 348/448 |
| 6,459,454 B1 | * 10/2002 | Walters | 348/448 |
| 6,459,455 B1 | * 10/2002 | Jiang et al. | 348/452 |
| 6,473,460 B1 | * 10/2002 | Topper | 375/240.16 |

* cited by examiner

Primary Examiner—Michael H. Lee
Assistant Examiner—Trang U. Tran
(74) Attorney, Agent, or Firm—Vedder, Price, Kaufman & Kammholz, P.C.

(57) ABSTRACT

An improved deinterlacing technique reconstructs regions of an image that change monotonically in the vertical direction (i.e., vertical deinterlacing). The present invention adapts to the image content without using spatio-temporal interpolation techniques. Rather, deinterlacing in accordance with the teachings of the present invention uses, for example, four localized input pixel values to produce an output pixel value that minimizes spatial artifacts (i.e., accurately reconstructs regions that change monotonically in the vertical direction). In another embodiment, an overlay scaler shares overlay scaling circuitry and deinterlacing circuitry to provide a cost effective implementation of a unique deinterlacing circuit. In another embodiment, a plurality of offsets are used in addition to three or more pixels.

15 Claims, 3 Drawing Sheets

METHOD AND APPARATUS FOR DEINTERLACING VIDEO

RELATED CO-PENDING APPLICATION

This is a related application to a co-pending application entitled, "An Improved Deinterlacing technique," having as inventors Richard W. Webb and Michael L. Lightstone, assigned to instant assignee, having Ser. No. 09/219,469, filed on Dec. 23, 1998 and hereby incorporated by reference.

FIELD OF THE INVENTION

The invention relates generally to deinterlacing of video data, and in particular, to an improved deinterlacing technique and apparatus.

BACKGROUND OF THE INVENTION

Video is generally represented as sequences of frames in accordance with either the interlaced or the progressively-scanned format (non-interlaced). Each frame includes a matrix of pixels that vary in color and intensity according to the image displayed.

In the interlaced scan format, a frame, which is a raster array of image bytes representing an image, includes a pair of fields, in which a field is a raster array of image bytes representing every other row of a frame and are derived from two different instants. The primary field of the pair of fields, for example, is the input field associated with the time instant for which the output frame is to be constructed and includes pixels that are located only on alternate rows (either odd or even rows) of the frame matrix, called horizontal lines. The secondary field includes pixels that are located on the corresponding horizontal lines of the frame matrix which are the missing pixels in the primary field. the pixels in the secondary field represent the portions of the image not represented in the primary field. The primary and secondary fields of a frame are scanned consecutively, for example, on a video display monitor at a rate of 60 fields/sec for purposes of reconstructing the entire image on the display at the industry interlaced scan standard 30 frames/sec display rate.

In the progressively scanned format, an image is represented in its entirety using only a single field that includes pixels in all horizontal lines of the frame matrix. Therefore, such frames can be progressively scanned on a displays at the standardized progressive display rate of 60 frames/sec.

Conventional television systems receive frames of video signals in an interlaced format. For example, the National Television System Committee (NTSC) standard is used to send and receive frames of television signals at a rate of 30 frames/second. Each frame contains 525 lines of video scan lines, which are divided into two interlaced fields. The interlaced fields are transmitted at a rate of 60 fields/second, or 30 frames/second. The receiver scans the two interlace fields of each frame, one by one, to display the interlaced video signals as television pictures.

Several video applications also use interlace scanning during image origination or capture as well as during signal transmission from the encoder, which codes the video signal, to the receiver. For example, digital video compression methods, such as the ISO (International Standards Organization) MPEG (Moving Pictures Expert Group) video compression standard, may be used to reduce the data rate to a level suitable for transmission over an available digital channel.

However, the display for these digitally compressed video image sequences at the decoders may not use interlaced scanning, or it may be desirable to use non-interlaced displays. For example, in large screen television displays, multimedia displays, or computer displays that support many text-oriented or graphics-oriented applications, a non-interlaced format is often preferred over an interlaced format for a variety of reasons, such as the reduced motion artifacts and flicker associated with the progressively scanned format.

Thus, there is a need to convert an interlaced format to a non-interlaced format. The process of converting an interlaced format to a non-interlaced format is generally referred to as deinterlacing (or line-doubling). Deinterlacing can be used to convert interlaced still pictures to non-interlaced still pictures, or to provide display of interlaced video on a progressive display (non-interlaced) computer monitor.

Also, many deinterlacing systems have separate hardware for performing the deinterlacing operation. This can result in unnecessary additional costs when implemented, for example, with three-dimensional graphics processing engines or other circuitry that perform horizontal and vertical scaling.

Two existing low cost deinterlacing techniques are commonly referred to as "bob" and "weave". For example, where a source format and final deinterlaced image are 480 lines high, split into two 240 line even and odd fields for transmission, storage, or other processing common in the video industry, these fields are sampled $1/60^{th}$ of a second apart for NTSC style video.

Weave simply combines an even and odd field together to make one frame. Assuming 240 lines in each field, interleaving (or "weaving") the even field lines into the even numbered lines of the result frame, and interleaving the odd field lines in the odd numbered lines of the result frame, produces a deinterlaced frame of 480 lines.

Weave produces a perfect visual result for still images, and maintains full resolution for vertical source image detail. However, since even and odd fields were sampled sequentially with a time difference between them ($1/60^{th}$ second for NTSC video), weave produces motion artifacts on moving picture elements, or on camera zooms and pans, i.e. any relative motion between the camera and any source image element.

When fields containing motion are simply woven together, there is an unnatural "comb" or "weave" artifact on edges. These effects make weave unsuitable for quality TV viewing, although it is inexpensive to implement.

Bob does not combine even and odd fields together; each displayed independently. Assuming 240 lines in each field, bob displays each field by itself for its correct $1/60^{th}$ second interval, then displays the next field for its correct $1/60^{th}$ second interval. Because each even or odd field only contains 240 even or odd lines and a full resolution picture contains 480 lines, each field must be upscaled vertically x2 during display. There is also a ½ line offset required to position the even and odd lines correctly. This produces a deinterlaced frame of 480 lines.

Bob produces an image which is temporally correct, since each field is only display correct time. However it suffers from vertical spatial aliasing This is because the original resolution of the source image frame was 480 lines vertically. To produce a 240 line field the original image must be vertically downsampled, discarding every second line. This is not too bad for natural imagery (streams and fields), because they do not contain a lot of vertical detail—in fact NTSC television works this way. For modern images, such as sports or newscasts with overlaid text or graphics, this downsampling produces two unacceptable artifacts.

The first is that in each field, half the information has been dropped through downsampling, causing spatial aliasing. Bob fills in the missing lines through interpolation of the lines above and below, but this is only a guess—the real information is not there. The result is that hard horizontal edges, such as the bottom of a square graphic image, or the crossbars on the letters "T" or "e" will appear and disappear from displayed field to displayed field. They also appear slightly shifted field to field due to the ½ line offset mentioned above. This on/off behaviour combined with the ½ line shift produce a jumpiness in the image, and this gives rise to the name "bob". This effect is closely related to the vertical downsampling and aliasing mentioned above. It can be alleviated somewhat by better downsampling techniques at the source (typically a television studio), but only by introducing extra fuzziness in the picture or greatly lowering its overall vertical resolution—not an acceptable tradeoff.

The second effect of the missing lines is that at any one display time only half the vertical resolution is shown, and the rest is interpolated with a lowpass filter. This makes the image fuzzier than the original, again causing an unacceptable quality loss.

Also, there are many deinterlacing techniques based on motion estimation and compensation which work very well, but they are too expensive to implement in low cost equipment, such as cost reduced televisions, settop boxes, or personal computer displays.

Other deinterlacing techniques, such as those described in co-pending application entitled "Improved Deinterlacing Technique," as referenced above, provide an improved deinterlacing technique by utilizing, for example, three localized input pixel values to produce an output pixel value that minimizes spatial artifacts. For example, such methods and devices typically avoid the use of fixed numerical thresholds or spatio-temporal interpolation techniques. One advantage can be a computationally efficient deinterlacing technique. Such a technique stays in weave mode whenever possible. This gives the best possible vertical resolution with no fuzziness, or other vertical aliasing artifacts When a particular set of conditions are detected in a set of three vertical pixels (from a set of even, odd, even lines, or odd, even, odd lines), it automatically and gradually transitions from weave to bob as the conditions making weave untenable increase. However, such techniques may cause a "bob" effect too readily. Accordingly, it would be desirable to have a method and apparatus that was computationally efficient but provided additional certainty as to whether or not vertical spatial high frequencies were present due to temporal motion or actual picture detail. In addition, it would be desirable to reduce the amount of hardware necessary, or software necessary, to implement such a deinterlacer.

DETAILED DESCRIPTION OF A PREFERRED EMBODIMENT OF THE INVENTION

Figure 1:
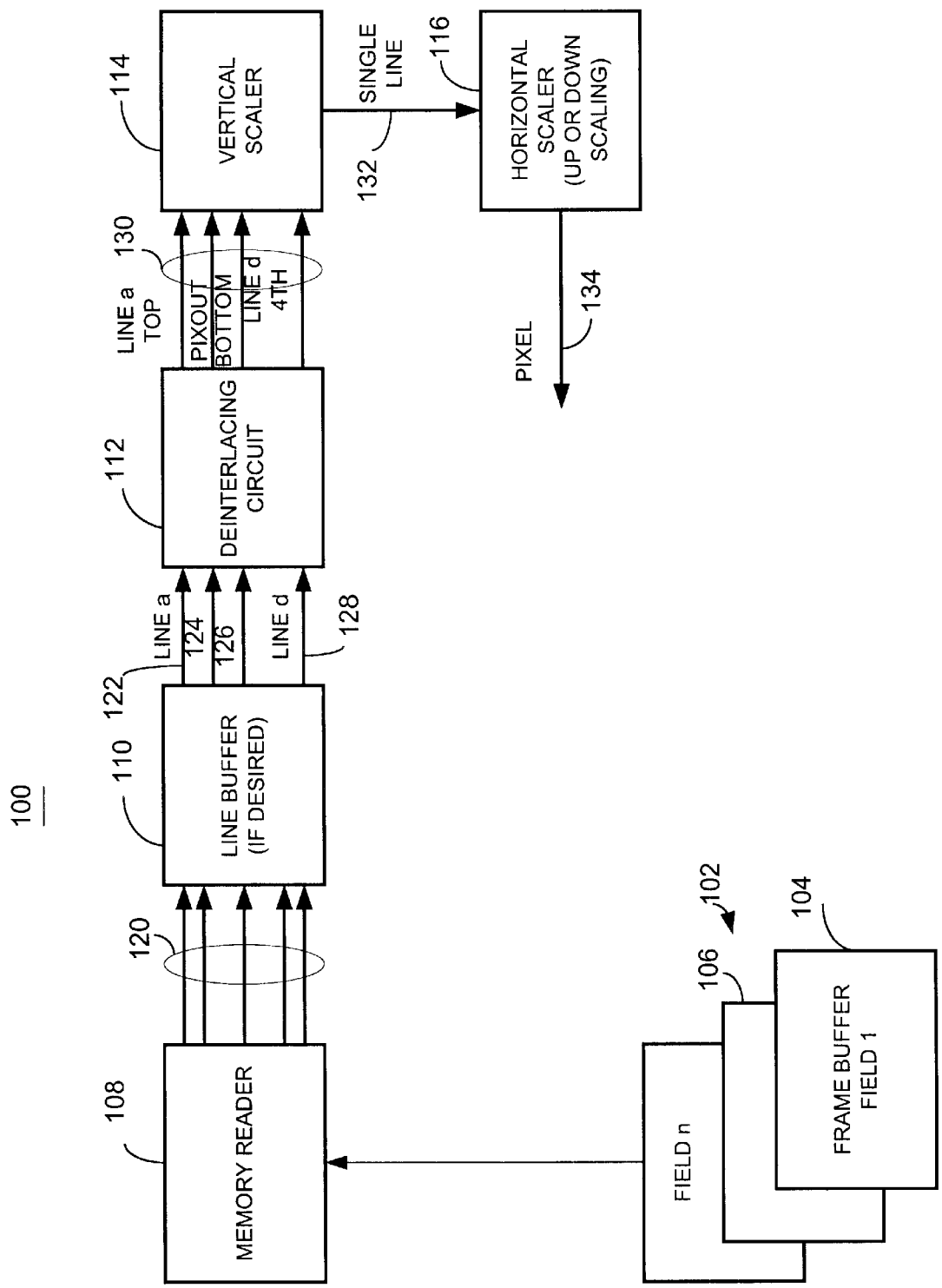
FIG. 1 is a block diagram illustrating one example of an overlay scaler that incorporates a deinterlacing circuit in accordance with one embodiment of the invention.

The disclosed invention provides an improved deinterlacing technique that reconstructs a progressive frame from deinterlaced fields, and is able to distinguish high vertical resolution detail from weaving artifacts. Deinterlacing in accordance with the teachings of the present invention uses, for example, four localized input pixel values to produce an output pixel value that minimizes spatial artifacts (i.e., accurately distinguishes high vertical resolution detail which should remain, from temporal errors such as weaving artifacts which should be removed). Thus, the present invention provides a higher quality and more computationally efficient deinterlacing technique than conventional deinterlacing techniques. The deinterlacing technique of the present invention adapts to image content and is noise tolerant (i.e., small deviations in the input pixel value produce only small changes in the output pixel value). For example, the present invention can provide an efficient deinterlacing implementation for a computer that includes, for example, a SIMD architecture based microprocessor or the well known INTEL PENTIUM MMX microprocessor. The method and apparatus adds movable thresholds, so that the transition to bob requires a larger amplitude artifact. This enables more hard edged or complicated graphics images to maintain their edges without "bobbing". The method and apparatus compares a fourth line with the original three. This makes it much easier to distinguish a hard graphics edge (which should be left in "weave" mode) from a "comb" artifact due to weaving a moving image, which should be allowed to go to bob. In addition, the operation can be integrated in a low cost manner with a typical display path.

In one embodiment, an overlay scaler shares overlay scaling circuitry and deinterlacing circuitry to provide a cost effective implementation of a unique deinterlacing circuit. In one embodiment, an overlay scaler includes a deinterlacing circuit that provides deinterlaced lines to a vertical scaling circuit that is operatively coupled to receive the deinterlaced data on a line by line basis. The vertical scaling circuit provides output to a horizontal scaler to produce horizontally scaled data after deinterlacing has occurred. A typical overlay includes a memory reader and possibly a line buffer for a plurality of lines from a plurality of fields. This allows the same pixel data in the correct presentation required for the disclosed deinterlacing technique. Hence, deinterlacing is added into an existing overlay display function, without an entirely separate memory reader and/or buffer structure. The disclosed technique can be easily integrated into other scaling and non-scaling architectures, such as but not limited to: memory to memory architectures based on a "blit engine", video capture pipelines, or a software scaler/deinterlacer which may function on a CPU or other suitable architectures.

In another embodiment, a plurality of offsets are used in addition to three or more pixels to provide a deinterlacing technique. For example, deinterlacing logic and method computes an output pixel (PIXOUT) of a secondary field, based on values of an input pixel (PIXIN) of the secondary field, a bottom pixel (BOTTOM) of a first or primary field, the BOTTOM being a pixel spatially below (PIXIN), and a top pixel (TOP) of the primary or first field, the TOP being a pixel spatially above PIXIN. PIXOUT is Computed according to an input/output curve which allows PIXIN to pass to PIXOUT when no undesirable motion artifacts are detected, and that converges to an average of bottom and top when at least one of a large undesirable motion artifact is detected. If desired, a fourth pixel ($4^{TH}$) of the second field, the 4th pixel being above TOP and above PIXIN, or below BOTTOM and below PIXIN may be used where PIXOUT is computed according to an input/output curve which allows PIXIN to pass to PIXOUT when no undesirable motion artifacts are detected, and that converges to an average of BOTTOM and TOP when at least one of a large undesirable motion artifact is detected.

The fourth pixel can provide additional information for the deinterlacing method so that "bob" is not too readily selected. For example, the disclosed method and apparatus can recognize a single line level of detail and not treat it as motion. For example, the fourth pixel can be used to show that the PIXIN is actually additional video detail so that a bob operation is not performed.

The method and apparatus may also set a value MAX+OFFSET1 equal to a maximum of the top and bottom plus a first offset amount (OFFSET1), and sets a value MIN−OFFSET2 equal to a minimum of the TOP and BOTTOM less the second offset amount (OFFSET2). The of offsets can improve deinterlacing quality in images with regions of mostly flat color with low contrast detail, such as a painted wall of a room. Without the offsets, in cases where the value of pixels TOP and BOTTOM are equal or nearly equal, PIXOUT would always be forced to a value in the small range between TOP and BOTTOM. This would unnecessarily suppress the low contrast detail, degrading the resultant image.

FIG. 1 illustrates one example of an overlay scaler 100 that includes frame buffer 102 containing a plurality of fields such as a first field 104 (the primary field) and a secondary field 106. The overlay scaler 100 may be implemented, for example, in a three dimensional graphics processing device, or in any other suitable device that performs vertical and/or horizontal scaling along with deinterlacing. The overlay scaler 100 includes a memory reader 108, a line buffer 110 (if desired), a deinterlacing circuit 112, a vertical scaler 114 and a horizontal scaler 116.

It will be recognized that the vertical scaler 114 can be set to scale value of one, i.e. no scaling is performed, and the horizontal scaler 116 can be set to a value of one or removed. The use of one or both scalers for actual scaling to change the image size is not required for the disclosed deinterlacing technique to be realized.

If the vertical scaler is programmed to one or is absent entirely, then the output from the deinterlacing circuit 112 sent to be single line 132 would be one of the middle two lines 130 output from the deinterlacing circuit 112. It would be the line in the same position as line 124 or 126 which would have been chosen by a conventional vertical scaler, if vertical scaler 114 were present, and programmed to a scale of one, and the deinterlacing circuit 112 were not present.

Frame buffer 102 contains, for example, field 104 containing odd lines and a consecutive field 106 containing even lines. The memory reader 108 then reads the appropriate field under control of, for example, a memory controller. The memory reader 108 outputs a number of lines 120 from a number of different fields from the frame buffer. The line buffer 110, may be used, if desired, to buffer the appropriate lines used as input to the deinterlacing circuit 112. In this example, four lines are used indicated as LINEa 122, to LINEd 128.

The deinterlacing circuit 112 may be, for example, in one embodiment, implemented in hardware, and is operatively coupled to receive field data 122–128 from first and second fields 104 and 106, or any other fields, if desired. The deinterlacing circuit produces deinterlaced data 130 on a line by line basis for the vertical scaler 114 based on an evaluation of four neighboring pixels.

The vertical scaling circuit 114 is suitably controllable to provide, for example, programmable scaling in a vertical direction, as known in the art. The vertical scaling circuit 114 receives the deinterlaced data 130 (e.g., on a four line by four line basis) and produces vertically scaled data 132 on a per line basis for the horizontal scaling circuit 116.

The horizontal scaling circuit 116, may provide up or downscaling in a horizontal direction, as known in the art. The horizontal scaling circuit is operatively coupled to the vertical scaling circuit 114 to receive the vertically scaled data 132. If no vertical scaling is performed, the deinterlaced data is passed to the horizontal scaling circuit. The horizontal scaling circuit 116 produces horizontally scaled data 134 for output to a display device. With the disclosed invention, the expensive memory reader and (if present) line buffer and output from the horizontal scaler to the display (or back to memory if a blit engine is present) is shared. In other words, a deinterlacer needs, and can share, the circuitry and operation of that a multi-line overlay or blit scaler is already using and doing. It will also be recognized that the horizontal and vertical scalers can be combined or changed in order.

The deinterlacing circuit 112 receives, for example, interlaced information from interlaced lines from a plurality of fields. The deinterlacing circuit then suitably deinterlaces, as further described below, to output deinterlaced data 130.

Figure 2:
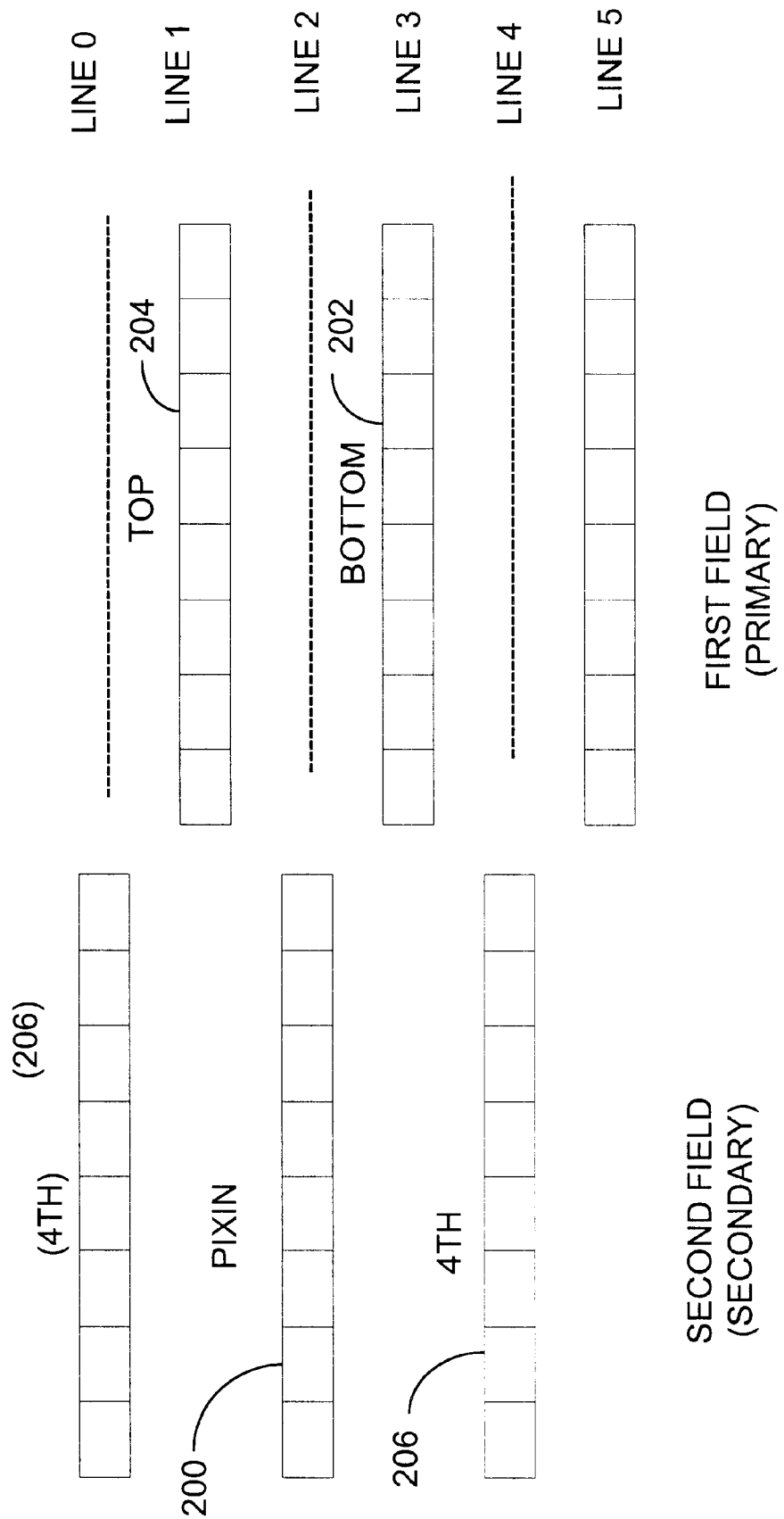
FIG. 2 graphically illustrates pixel information utilized in a deinterlacing circuit and method in accordance with one embodiment of the invention.

Referring to FIGS. 1 and 2, the deinterlacing circuit 112 includes deinterlacing logic which is operative to compute an output pixel (PIXOUT) for a given line 130. The output line 130 is actually a group of four output lines. TOP and BOTTOM lines always pass straight through, but PIXOUT and $4^{th}$ may be modified by the deinterlacing process. The output pixel PIXOUT of a second field such as a secondary field is based on values of an input pixel 200 of the second field for a frame buffer, a bottom pixel (BOTTOM) 202 of the first field from the frame buffer, the BOTTOM being a pixel spatially below PIXIN 200. The deinterlacing logic also uses a top pixel (TOP) 204 of the first field, the TOP being a pixel spatially above PIXIN, and also uses a fourth pixel 206 (4th) of a second-field the 4th being a pixel spatially above or below PIXIN. The output pixel PIXOUT is computed according to an input/output curve which allows PIXIN to pass to PIXOUT when no undesirable motion artifacts are detected, and that converges to an average of BOTTOM and TOP when at (least one of) an undesirable motion artifact is detected. In the limiting case where PIXOUT has been replaced by an average of BOTTOM and TOP, then $4^{th}$ (in 130) will also be replaced by an average OM and TOP, otherwise $4^{th}$ (in 130) will pas untouched.

Out of the four lines 122, 124, 126, 128, TOP and BOTTOM are always the two lines from the first field, PIXIN is always the line from the second field which is positioned spatially in between TOP and BOTTOM, $4^{th}$ line is thus the remaining line from the second field which does not fit the above description of PIXIN.

As the vertical scaler 114 controls the memory reader to traverse the input space while producing an output field, the $4^{th}$ line will come from either LINEa 122 or LINEd 128. It will retain this relative position in the output lines 130, either as LINEa above TOP (not shown in 100), or LINEd below BOTTOM (as shown in 100). Thus the position of the $4^{th}$ line is chosen automatically by the actions of retrieving four lines of the source.

The deinterlacing logic is also operative to compute the output pixel based on three lines instead of four, so that only the BOTTOM, PIXIN and TOP pixels are evaluated. In this embodiment, the $4^{th}$ input line $4^{th}$ output line are not evaluated or modified, although the $4^{th}$ input line may be passed directly to be a $4^{th}$ output line for use by following processes. (Accordingly, in FIG. 3 described below, the answer to 312 and 314 would default to "yes" if the $4^{th}$ line is not used.

As used herein, an average value (AVG) is equal to the TOP plus BOTTOM divided by two. In addition, a MIN value is equal to a minimum of the TOP and BOTTOM. A maximum value MAX is set equal to the maximum of the TOP plus BOTTOM. A 4thOUT is initially set equal to a 4thIN. The value of the 4th pixel that is input to the vertical scaling circuit is usually unchanged. When the deinterlacing circuit 112 (e.g., algorithm) determines that there is a maximum artifact, 4thOUT is replaced by AVG, as in blocks 320 and 328 of FIG. 3 described below.

As known to one or ordinary skill in the art, a typical overlay includes a memory reader and possibly a line buffer for a plurality of lines from a plurality of fields. This is the same pixel data required for the disclosed deinterlacing technique. This allows deinterlacing to be added into an existing overlay display function, without an entirely separate memory reader and/or buffer structure.

It will be recognized that the disclosed deinterlacing technique can be easily integrated into other scaling architectures, such as but not limited to: memory to memory scaling architectures based on a hardware "blit engine", or a software scaler/deinterlacer which may function on a CPU, and any other suitable architectures An offset value is added to the MAX value and/or MIN value to allow a weave to occur more often. Producing blends or modified pixels too readily can cause an image to appear blurry. Accordingly, with the addition of offsets as described herein, a small amount of motion may be allowed before a "bob" will take place. This could also be advantageous when an image has regions of mostly flat color with low contrast detail, as the MIN and MAX values can be very close together. In this case positive offsets in OFFSET1 and OFFSET2 will leave the original pixel information in when PIXIN is only slightly outside the range of MAX and MIN, to retain detail in certain pictures.

Accordingly, the deinterlacing logic may calculate PIX-OUT according to an input output curve that converges to an average of the TOP and BOTTOM and wherein the deinterlacing circuit sets a value MAX+OFFSET1 equal to a maximum of the TOP and BOTTOM plus a first offset amount (OFFSET1). The deinterlacing circuit sets a value MIN-OFFSET 2 equal to a minimum of the TOP and BOTTOM less a second offset (OFFSET 2).

The deinterlacing logic determines whether to weave lines of the first and second fields based on whether PIXIN is less than or equal to the value MAX+OFFSET 1 and whether PIXIN is greater than or equal the value MIN-OFFSET 2. In addition, the deinterlacing logic determines how much to blend pixels from the first and second fields based upon a comparison of PIXIN to MAX+OFFSET 1 and MIN-OFFSET 2. In addition, if desired, a fourth pixel can be used in addition to decide whether or not to alter the value of PIXOUT. The $4^{th}$ pixel itself may also be altered.

Figure 3:
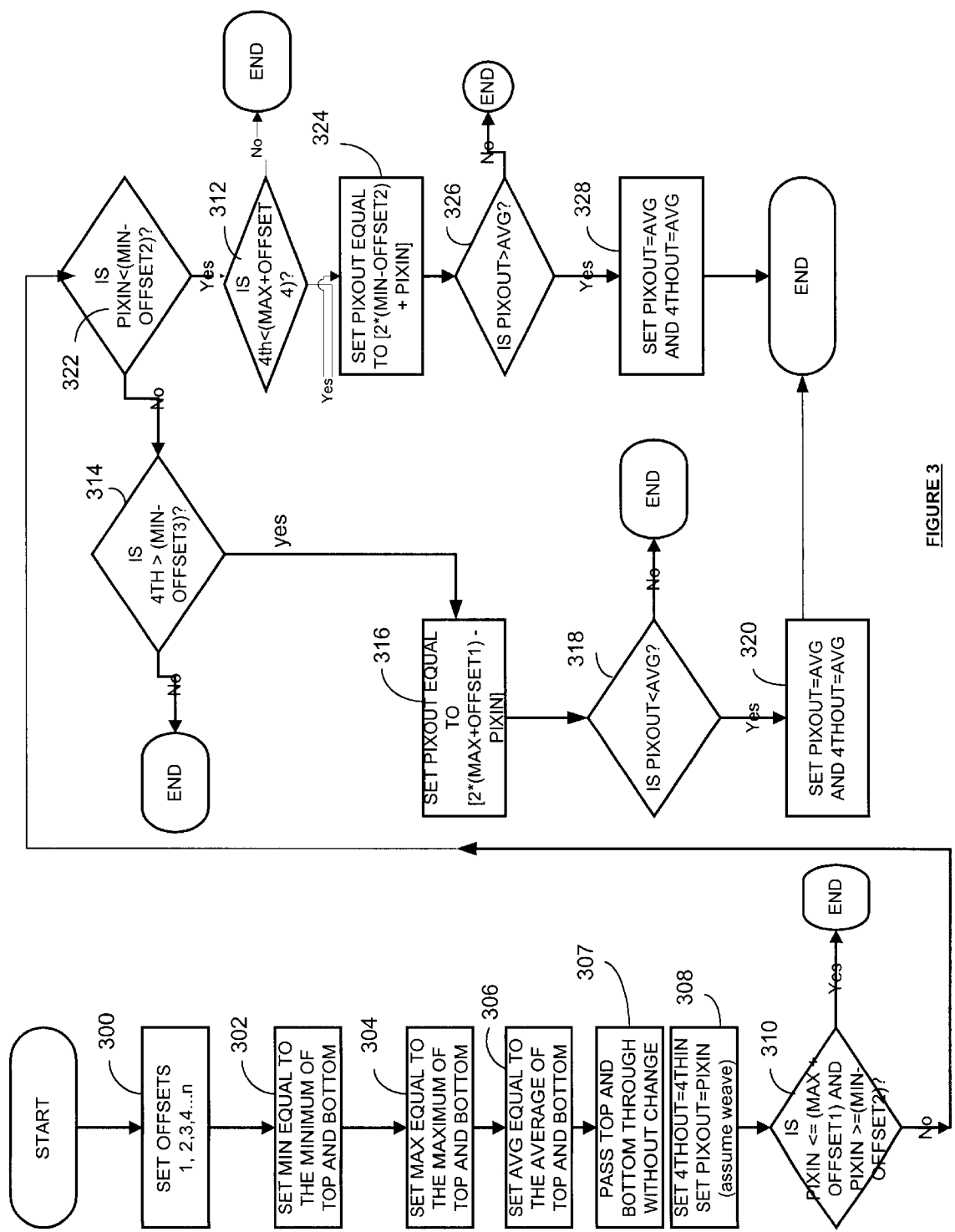
FIG. 3 is a flowchart illustrating one example of a deinterlacing method in accordance with one embodiment of the invention.

As shown in FIG. 3, a method for deinterlacing includes setting the requisite offsets, based on a priori testing indicative of suitable offsets for a desired picture quality. This is shown in block 300. The offset values are determined using industry standard methods involving testing with an audience using a representative variety of source images. For digital video based on 8 bit ITU-601 levels, the following values produce acceptable results:

TABLE 1

| Parameter | Typical Visually Acceptable Range | Recommended Offset Value | Range of Values Which Process Should Accept |
|---|---|---|---|
| OFFSET1 | 0–16 | 8 | −256 to 256 |
| OFFSET2 | 0–16 | 8 | −256 to 256 |
| OFFSET3 | 0–16 | 0 | −256 to 256 |
| OFFSET4 | 0–16 | 0 | −256 to 256 |

Values outside the acceptable range may produce better images on some source material, such as test patterns. Any implementation must accommodate values outside the typically acceptable range, such as −256 to 256 for 8 bit ITU-601 input data.

Setting OFFSET1 and OFFSET2 to values outside the range of possible input values, such as OFFSET1=256 and OFFSET2=256 for 8 bit ITU-601 input data, may be used as a method to disable the deinterlacing and force a weave. Setting OFFSET3 and OFFSET4 to values outside the range of possible input values, such as OFFSET4=256 and OFFSET3=256 for 8 bit ITU-601 input data, may be used as a method to disable the use of the $4^{th}$ line.

Accordingly, an offset value OFFSET 1, OFFSET 2, OFFSET 3 and OFFSET 4 may be selected. As shown in block 302, the method includes setting MIN equal to the minimum of the TOP and BOTTOM. As shown in block 304, the method includes setting MAX value equal to the maximum of the TOP and BOTTOM. As shown in block 306, the method includes setting the AVG equal to the average of the TOP and BOTTOM. As shown in block 307, the the pixels TOP and BOTTOM always pass from input to output in the deinterlacing circuit without modification.

As shown in block 308, the method includes setting the output pixel value $4^{TH}$ OUT equal to (into the deinterlacer) the $4^{TH}$ IN, and setting the output pixel value PIXOUT equal to (into the deinterlacer) the PIXIN. This precalculates the output values with the assumption that weave will be selected and the input values will pass through to be used as the output values. Blocks 316, 320, 324 and 328 may modify these preset values.

As shown in block 310, the method includes determining whether PIXIN is less than or equal to MAX+OFFSET 1 and also determining if PIXIN is greater than or equal to MIN−OFFSET 2. If both conditions are true, PIXIN is left equal to PIXOUT, $4^{th}$OUT is left equal to 4thIN, and a weave on a per line basis is performed by the deinterlacing logic. Positive offsets in OFFSET1 and OFFSET2 will cause the system to exit at 310 with unmodified data more often, especially when hard edged graphics are present, such as text or graphics visual information in a sports or newscasts.

At this point (the NO output of 310) the first test has been passed. This test result indicates that based on three lines, there may be a motion artifact generated by simply weaving PIXIN from the second field with TOP and BOTTOM from the first field, and it has been determined that it may be required to modify PIXOUT and/or 4thOUT based on this first test.

If test (block 322) determines that PIXIN was less than MIN−OFFSET2, then the process will use steps in blocks 312, 324, 326, and 328 to determine the output. Otherwise, the result of this test together with the result of the test from block 310 indicates that the process should use steps in blocks 314, 316, 318, 320 to determine the output. These two paths contain similar complementary processes.

If PIXIN was less than MIN−OFFSET2, then a $4^{th}$ pixel $4^{th}$ IN may be additionally tested (as shown in block 312) to ensure that it is less than MAX+OFFSET4. This $4^{th}$ line test may be bypassed by setting OFFSET4 to 256 for 8 bit ITU-601 scaled input data.

If two pixels from the second field (PIXIN $4^{th}$ IN) are less than two pixels from the first field (MIN and MAX respectively as modified by OFFSET2 and OFFSET4 respectively), then it is very likely that these four pixels contain weave artifacts and should be modified by a process. If test as shown in block 322 passes but test 312 fails, then it is likely that PIXIN contains a single line which is substantially different from TOP and BOTTOM, but the $4^{th}$ IN is similar to TOP and BOTTOM. This is not likely to be a weave artifact, and the process will stop (the NO output of 312) leaving PIXOUT and 4thOUT equal to the input values set in 308. OFFSET4 can be adjusted based on standard visual testing techniques to determine an acceptable threshold.

If the test in block 312 is passed, PIXOUT is set equal to [2*(MIN−OFFSET2)+PIXIN] as shown on block 324. This function, without the OFFSET2 term, is described for example in the co-pending application identified above and incorporated herein by reference. Together with the tests in blocks 310 and 322, PIXOUT will have a minimum value of MIN−OFFSET2, achieved when PIXIN=MIN−OFFSET2. As the value of PIXIN drops below MIN−OFFSET2, the value of PIXOUT will rise in the opposite direction by an equal amount. The value of PIXOUT remains less than or equal to AVG, the step in block 326 will pass the value of PIXOUT determined in block 324 to the output, and leave 4thOUT equal to 4thIN as set in block 308. If the value of PIXOUT determined in block 324 exceeds AVG, the process of block 326 will clamp the value of PIXOUT at AVG, and also force $4^{th}$OUT to AVG. The steps of blocks 324 and 326 provide two functions. If the answer to block 326 is no, the process of block 324 smoothly transitions PIXOUT from the weave value of PIXIN and converges to the bob value of AVG. If the answer to block 326 is yes, this means that the maximum bob value has been achieved for PIXOUT, and the $4^{th}$ line probably also contains a large weave error. In this case the $4^{th}$ line 4thOUT is also replaced by the full bob value of AVG.

If PIXIN was greater than MAX+OFFSET1, then a $4^{th}$ pixel $4^{th}$ IN maybe additionally tested to ensure that it is greater than MIN−OFFSET3,as shown in block 314. This $4^{th}$ line test may be bypassed by setting OFFSET3 to 256 for 8 bit ITU-601 scaled input data.

If two pixels from the second field (PIXIN $4^{th}$ IN) are greater than two pixels from the first field (MAX and MIN respectively as modified by OFFSETI and OFFSET3 respectively), then it is very likely that these four pixels contain weave artifacts and should be modified by a process. If the test of block 314fails, then it is likely that PIXIN contains a single line which is substantially different from TOP and BOTTOM, but the 4thIN is similar to TOP and BOTTOM. This is not likely to be a weave artifact, and the process will stop (the NO output of 314) leaving PIXOUT and 4thOUT equal to the input values set in 308. OFFSET3 can be adjusted based on standard visual testing techniques to determine an acceptable threshold.

If test 314 is passed, PIXOUT is set equal to [2*(MAX+OFFSET1)−PIXIN]. This function, without the OFFSETI term, is described in the co-pending application. Together with test 310, PIXOUT will have a maximum value of MAX+OFFSET1, achieved when PIXIN=MAX+OFFSET1. As the value of PIXIN rises above MAX+OFFSET1, the value of PIXOUT will fall in the opposite direction by an equal amount. If the value of PIXOUT remains greater than or equal to AVG, 318 will pass the value of PIXOUT determined in 316 to the output, and leave 4thOUT equal to $4^{th}$IN as set in 308. If the value of PIXOUT determined in 316 is below AVG, 318 will clamp the value of PIXOUT at AVG, and also force $4^{th}$OUT to AVG. 316 and 318 provide two functions. If the answer to 318 is no, 316 smoothly transitions PIXOUT from the weave value of PIXIN and converges to the bob value of AVG. If the answer to 318 is yes, this means that the maximum bob value has been achieved for PIXOUT, and the $4^{th}$ line probably also contains a large weave error. In this case the $4^{th}$ line 4thOUT is also replaced by the full bob value of AVG.

The method of FIG. 3 may be suitably carried out by software program executed on a processing device, or can be carried out by the deinterlacing circuit, or any suitable combination of hardware and software as desired. The method of FIG. 3 may be embedded in a display path such as an overlay, or as part of a "blit" engine commonly used for video, graphics or 3D pixel processing. This engine may be operating in modes where the input pixels come from the CPU via a bus, or from a memory, and the output pixels may return to the CPU via a bus, to a memory for later use, or they may proceed further along a display pipe to a visual display device.

Accordingly, based on the above operation, the method and apparatus determines if PIXIN from a second field is outside the range of the minimum and maximum of surrounding pixels from a first field (as modified by visual tuning offsets) and if so, then compares another pixel from a second field with a nearby pixel from a first field (as modified by visual tuning offsets) to see if the fourth pixel value also indicates a possible motion artifact. If so, then the algorithm assumes that motion has occurred and the method replaces the PIXIN value with a value starting from PIXIN, and converging to the average of the surrounding pixels from the first field as the detected motion increases. The vertical scaler receives pixel values from the middle lines, such as PIXOUT and BOTTOM or PIXOUT and TOP. It may also receive four pixels, including TOP, PIXOUT, BOTTOM, and $4^{th}$ OUT. The value of the fourth pixel is set equal to the average when PIXOUT approaches the average value, as this indicates that the second field is substantially different from the first field, and the input from the second field should not be contained in the output lines The pixels TOP and BOTTOM from the first field always pass from input to output without modification.

As described above, in one embodiment, a method for deinterlacing includes receiving an interlaced frame of data, the frame including a primary field and a secondary field, and deinterlacing the frame, the deinterlacing including computing an output pixel, PIXOUT, of the secondary field based on an input pixel, PIXIN, of the secondary field, a bottom pixel, BOTTOM, of the primary field, and a top pixel, TOP, of the primary field, in which PIXOUT is computed according to an input/output curve that converges to an average of BOTTOM and TOP.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. An overlay scaler comprising:
   a de-interlacing circuit operatively coupled to receive field data from a first field and field data from a second field and operative to produce de-interlaced data;
   a vertical scaling circuit operatively coupled to receive the de-interlaced data and to produce vertically scaled data; and
   a horizontal scaling circuit operatively coupled to receive the vertically scaled data from the vertical scaling circuit and to produce horizontally scaled data;
   wherein the de-interlacing circuit comprises de-interlacing logic operative to compute an output pixel (PIXOUT) of the second field based on values of an input pixel (PIXIN) of the second field, a bottom pixel (BOTTOM) of the first field, the BOTTOM being a pixel spatially below (PIXIN), a top pixel (TOP) of the first field, TOP being a pixel spatially above PIXIN, and a forth pixel ($4^{TH}$) of the second field, the $4^{TH}$ being a pixel spatially above or below PIXIN, wherein PIXOUT is computed according to an input/output curve that converges to an average of BOTTOM and TOP.

2. An overlay scaler comprising:
   a de-interlacing circuit operatively coupled to receive field data from a first field and field data from a second field and operative to produce de-interlaced data;
   a vertical scaling circuit operatively coupled to receive the de-interlaced data and to produce vertically scaled data; and
   a horizontal scaling circuit operatively coupled to receive the vertically scaled data from the vertical scaling circuit and to produce horizontally scaled data;
   wherein the de-interlacing circuit comprises de-interlacing logic operative to compute an output pixel (PIXOUT) of the second field based on values of an input pixel (PIXIN) of the second field, a bottom pixel (BOTTOM) of the first field, the BOTTOM being a pixel spatially below (PIXIN), and a top pixel (TOP) of the first field, the TOP being a pixel spatially above PIXIN, wherein PIXOUT is computed according to an input/output curve that converges to an average of BOTTOM and TOP wherein the de-interlacing circuit sets a value MAX+OFFSET1 equal to a maximum of the TOP and the BOTTOM plus a first offset amount, and sets a value MIN−OFFSET2 equal to a minimum of the TOP and BOTTOM less a second offset amount.

3. The overlay scaler of claim 2 wherein the deinterlacing logic determines whether to weave lines of the first and second fields based on whether PIXIN is less than or equal to value MAX+OFFSET1 and whether PIXIN is greater than or equal to value MIN−OFFSET2.

4. The overlay scaler of claim 2 wherein the deinterlacing logic determines whether to blend pixels from the first field and the second field based on a comparison of PIXIN to MAX+OFFSET1 and MIN−OFFSET2.

5. The overlay scaler of claim 2 wherein if PIXIN is between MAX+OFFSET1 and MIN−OFFSET2, then the deinterlacing logic performs a weave operation including passing PIXIN to PIXOUT without change and passing $4^{TH}$ IN to $4^{th}$ OUT without change.

6. An overlay scaler comprising:
   a de-interlacing circuit operatively coupled to receive field data from a first field and field data from a second field and operative to produce de-interlaced data;
   a vertical scaling circuit operatively coupled to receive the de-interlaced data and to produce vertically scaled data; and
   a horizontal scaling circuit operatively coupled to receive the vertically scaled data from the vertical scaling circuit and to produce horizontally scaled data;
   wherein the deinterlacing logic determines whether to modify pixels from the second field based on a comparison of a $4^{th}$ pixel of the second field to a MIN value modified by a third offset value or a MAX value modified by a forth offset value.

7. The overlay scaler of claim 6 wherein the deinterlacing logic modifies the PIXOUT value to move towards an average (AVG) of TOP and BOTTOM.

8. An overlay scaler comprising:
   a de-interlacing circuit operatively coupled to receive field data from a first field and field data from a second field and operative to produce de-interlaced data;
   a vertical scaling circuit operatively coupled to receive the de-interlaced data and to produce vertically scaled data; and
   a horizontal scaling circuit operatively coupled to receive the vertically scaled data from the vertical scaling circuit and to produce horizontally scaled data;
   wherein the deinterlacing logic:
      sets PIXOUT equal to PIXIN in response to determining that a $4^{th}$ pixel of the second field is less than or equal to MIN less a third offset amount, and
      sets PIXOUT equal to PIXIN in response to determining that a $4^{th}$ pixel of the second field is greater than or equal to MAX plus a fourth offset amount.

9. A de-interlacing method for de-interlacing data from at least a first field and a second field comprising steps of:
   obtaining an input pixel (PIXIN) of the second field, a bottom pixel (BOTTOM) of the first field, the BOTTOM being a pixel spatially below (PIXIN), a top pixel (TOP) of the first field, TOP being a pixel spatially above PIXIN, and a fourth pixel ($4^{TH}$) of the second field, the $4^{TH}$ being a pixel spatially above or below PIXIN; and
   computing an output pixel (PIXOUT) of a second field based on PIXIN, BOTTOM, TOP and $4^{th}$, wherein PIXOUT is computed according to an input/output curve that converges to an average of BOTTOM and TOP.

10. The method of claim 9 including the steps of:
    setting a value MAX+OFFSET1 equal to a maximum of the TOP and the BOTTOM plus a first offset amount, and setting a value MIN−OFFSET2 equal to a minimum of the TOP and BOTTOM less a second offset amount.

11. The method of claim 10 including the step of determining whether to modify pixels from the second field based on a comparison of PIXIN to MAX+OFFSET1 and MIN−OFFSET2.

12. The method of claim 10 wherein if PIXIN is between MAX+OFFSET1 and MIN−OFFSET2, then perform a weave operation including passing PIXIN to PIXOUT without change and passing $4^{TH}$ IN to $4^{th}$ OUT without change.

13. The method of claim 12 including the step of determining whether to modify pixels from the second field based on a comparison of $4^{th}$ IN to a MIN value modified by a third offset value or a MAX value modified by a fourth offset value.

14. The method of claim 13 including the step of modifying the PIXOUT value to move towards an average (AVG) of TOP and BOTTOM.

15. The method of claim 13 including the steps of:
    setting PIXOUT equal to PIXIN in response to determining that the $4^{th}$ is less than or equal to MIN less the third offset amount, and
    setting PIXOUT equal to PIXIN in response to determining that the $4^{th}$ is greater than or equal to MAX plus the fourth offset amount.

* * * * *